(12) United States Patent
Niki et al.

(10) Patent No.: US 11,474,662 B2
(45) Date of Patent: Oct. 18, 2022

(54) INFORMATION PROCESSING METHOD, INFORMATION PROCESSING APPARATUS, AND INFORMATION PROCESSING PROGRAM

(71) Applicant: LINE CORPORATION, Tokyo (JP)

(72) Inventors: Shohei Niki, Tokyo (JP); Takumi Sasaki, Tokyo (JP)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 16/833,005

(22) Filed: Mar. 27, 2020

(65) Prior Publication Data

US 2020/0225832 A1     Jul. 16, 2020

Related U.S. Application Data

(63) Continuation of application No. PCT/JP2017/035360, filed on Sep. 28, 2017.

(51) Int. Cl.
*G06F 3/048*     (2013.01)
*G06F 3/04817*     (2022.01)
(Continued)

(52) U.S. Cl.
CPC ...... *G06F 3/04817* (2013.01); *G06F 3/04847* (2013.01); *H04L 51/02* (2013.01);
(Continued)

(58) Field of Classification Search
CPC . G06F 3/04817; G06F 3/04847; H04L 51/02; H04L 51/04; H04L 51/046
See application file for complete search history.

(56) References Cited

U.S. PATENT DOCUMENTS

2012/0011453 A1*   1/2012   Shimono ............. H04L 51/10
                                                     715/753
2013/0346886 A1    12/2013   Cauchois et al.
(Continued)

FOREIGN PATENT DOCUMENTS

JP       2006-209332 A     8/2006
JP       2017-500625 A     1/2017
(Continued)

OTHER PUBLICATIONS

International Search Report for PCT/JP2017/035360 dated Nov. 7, 2017 [PCT/ISA/210].
(Continued)

*Primary Examiner* — Claudia Dragoescu
(74) *Attorney, Agent, or Firm* — Sughrue Mion, PLLC

(57) ABSTRACT

An information processing method includes: a receiving step for receiving a message; an outputting step of outputting display information for associating and displaying the message received in the reception step with an icon associated with an account that is associated with the user that has transmitted the message; and a changing step of changing the ion associated with the account that has transmitted the message, if the message includes icon information to be displayed as the speaker of the message. When the changing step has changed the icon, the outputting step outputs display information for associating and displaying the message received in the receiving step with the changed icon.

18 Claims, 9 Drawing Sheets

BEFORE ICON CHANGE          AFTER ICON CHANGE

(51) Int. Cl.
*G06F 3/04847* (2022.01)
*H04L 51/02* (2022.01)
*H04L 51/04* (2022.01)
*H04L 67/306* (2022.01)
*H04L 67/55* (2022.01)

(52) U.S. Cl.
CPC ............ *H04L 51/04* (2013.01); *H04L 67/306* (2013.01); *H04L 67/55* (2022.05)

(56) References Cited

U.S. PATENT DOCUMENTS

| | | | | |
|---|---|---|---|---|
| 2014/0181228 | A1* | 6/2014 | Cho | H04L 51/04 709/206 |
| 2019/0034522 | A1* | 1/2019 | Kim | G10L 15/22 |
| 2019/0079704 | A1* | 3/2019 | Tokuchi | H04L 51/20 |

FOREIGN PATENT DOCUMENTS

| | | |
|---|---|---|
| KR | 10-2013-0071958 A | 7/2013 |
| KR | 10-2014-0047491 A | 4/2014 |
| KR | 10-2016-0075172 A | 6/2016 |
| KR | 10-2017-0018577 A | 2/2017 |

OTHER PUBLICATIONS

Office Action dated Jul. 27, 2021 in Japanese Application No. 2019-545519.
The chat bot "Minervae ViBOT (Minerva *****)" in which "image recognition is possible—the service-starts schedule ", [online], Aug. 9, 2017, Cresco Ltd., [Jul. 15, 2021 search], and the Internet URL:https://www.cresco.co.jp/news/2017/08/09/minervae-vibot- prior. html (4 pages total).
ECzine Editing part [], "LOHACO, Chat Bots" combined with the provision of a test manned on line, [online], Nov. 22, 2016, [search on Jul. 15, 2021], Internet URL:https://eczine.jp/news/detail/3881 (6 pages total).
"User supporting business is automatically performed by user local, AI, customer support business", [online], Feb. 3, 2017, User Local, Inc., Jul. 15, 2021; Internet URL:https://www.userlocal.jp/news/ 201702031 (7 pages total).
A corporate support service fora corporation utilizing "LINE" online], Apr. 11, 2017, LINE,"search on Jul. 15, 2021", and Internet URL:https://linecorp.com/ja/pr/news/ja/2017/1716 (5 pages total).
A new service appears in "business chat"! A free period of trials is tested for 14 days from 14 days to 30 days. InCircle New version, [online], Jul. 8, 2016, AOS Mobile Co., Ltd., [search], Internet URL:https://www.aostech.co.jp/wp/content/uploads/20160708_ InCircle_renew_trial.pdf (6 pages total).
MarkeZine editing part [Knitting] / Masaya [Gist] / Sekiguchi ** [Copy], "Important features of the character?". Regarding KDDI Evolva, LINE Introduction, Aug. 9, 2017, search on Jul. 15, 2021, Internet URL:https://markezine.jp/article/detail/26800 (4 pages total).
Written Opinion of the International Searching Authority dated Nov. 7, 2017 in International Application No. PCT/JP2017/035360.
Notice of Reasons for Refusal dated Sep. 21, 2021 from the Japanese Patent Office in JP Machine Application No. 2021-074149.
Office Action dated Jan. 27, 2022 from the Korean Intellectual Property Office in KR Application No. 10-2020-7009498.
Office Action dated Feb. 1, 2022 in Japanese Application No. 2021-074149.
"Solution & Services", Call Center Japan, 2016, vol. 19, No. 9, pp. 76-80 (7 pages total).
Office Action dated May 17, 2022 in Japanese Application No. 2021-74149.
Communication dated Jul. 9, 2022, issued in Korean Application No. 10-2020-7009498.

* cited by examiner

FIG. 3A
| DESTINATION USER ID | MESSAGE TYPE | MESSAGE CONTENTS | ICON INFORMATION | USER NAME INFORMATION |
|---|---|---|---|---|
FIG. 3B
| ICON ID | USER NAME | ICON |
|---|---|---|
| ... | ... | ... |
| LO_0001 | OPERATOR | 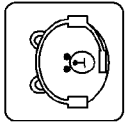 |
| LO_0002 | BOT | 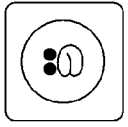 |
| LO_0003 | SALLY | 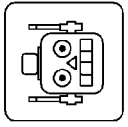 |
| ... | ... | ... |

BEFORE ICON CHANGE

AFTER ICON CHANGE

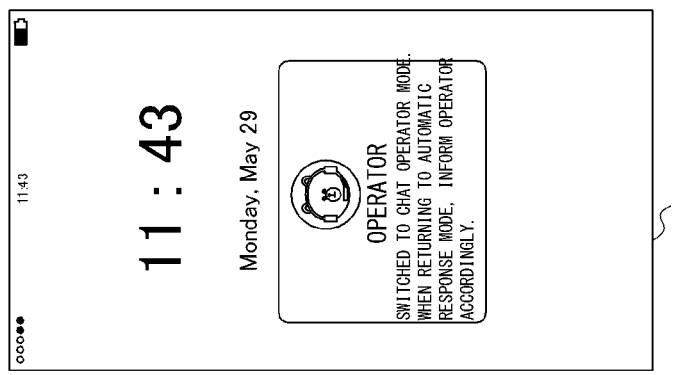
FIG. 8A BEFORE ICON CHANGE
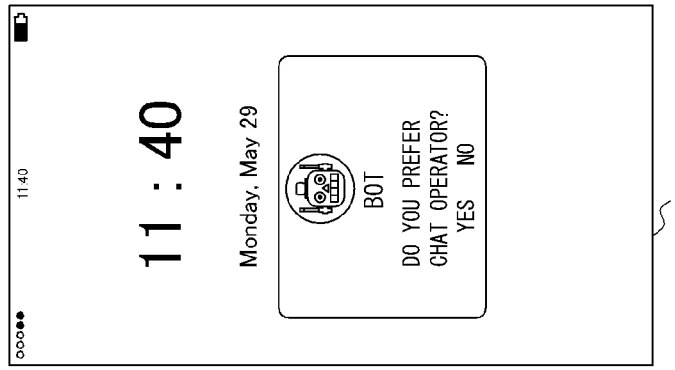
FIG. 8B AFTER ICON CHANGE

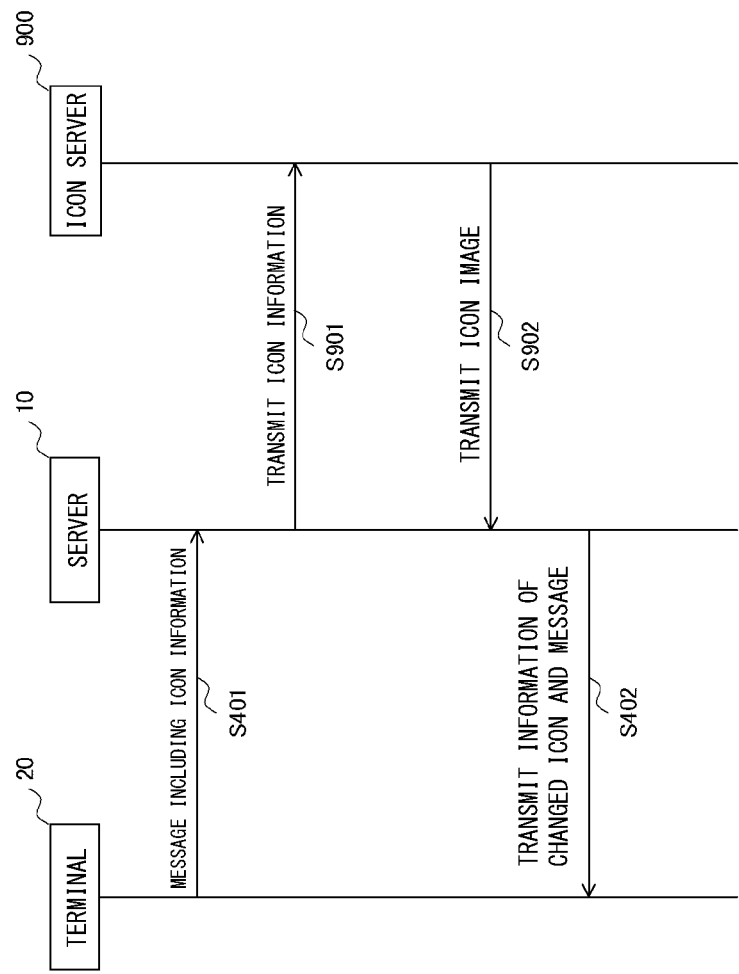

INFORMATION PROCESSING METHOD, INFORMATION PROCESSING APPARATUS, AND INFORMATION PROCESSING PROGRAM

CROSS-REFERENCE TO RELATED APPLICATION

This application is a continuation application of International Application No. PCT/JP2017/035360, filed on Sep. 28, 2017, the disclosure of which is incorporated herein by reference in its entirety.

BACKGROUND

1. Technical Field

The present disclosure relates to an information processing method, an information processing apparatus, and an information processing program that clearly indicate switching of a user in a talk in which two or more users are present.

2. Description of Related Art

A number of messenger applications have been developed and provided. A profile of a user that uses a messenger application can be confirmed in recent years. For example, a profile providing method may allow a user to access his/her profile or a friend's profile.

Chatbots may mimic human speech to stimulate a conversation or interaction with a real person. Chatbots are also known as conversional agents, and commonly used to provide a customer support service. However, many customers think that chatbots are unappealing and annoying because the chatbots conduct clumsy conversions. For that reason, some customers prefer human agents to chatbots for their customer service engagements and request a switch from the chatbot to a human agent/operator. However, conventional messenger application profile providing methods do not provide a feature that allows a user to check whether the conversation partner has been changed from the chatbot to a human agent/operator on the messenger application.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide an information processing method, an information processing apparatus, and an information processing program allowing a user to check a switch of users at a glance in an instant messaging service.

An information processing method for providing a chat room for exchanging messages between at least a first user corresponding to a first account and a second user corresponding to a second account according to an embodiment of the present disclosure includes: a receiving step of receiving a message; an outputting step of outputting display information for displaying the message received in the receiving step in association with an icon that is associated with an account corresponding to a user that has transmitted the message; and a changing step of changing, when the message includes icon information to be displayed as a sender of the message, the icon corresponding to the account that has transmitted the message. The outputting step outputs, when the changing step changes the icon, display information for displaying the message received in the receiving step in association with the changed icon.

An information processing apparatus for providing a chat room for exchanging messages between at least a first user corresponding to a first account and a second user corresponding to a second account according to an embodiment of the present disclosure includes: a receiving unit for receiving a message; an outputting unit for outputting display information for displaying the message received by the receiving unit in association with an icon that is associated with an account corresponding to a user that has transmitted the message; and a changing unit for changing, when the message includes icon information to be displayed as a sender of the message, the icon corresponding to the account that has transmitted the message. The outputting unit outputs, when the changing unit changes the icon, display information for displaying the message received by the receiving unit in association with the changed icon.

A storage medium storing an information processing program according to an embodiment of the present disclosure that causes an information processing apparatus for providing a chat room for exchanging messages between at least a first user corresponding to a first account and a second user corresponding to a second account to execute: a receiving function of receiving a message; an outputting function of outputting display information for displaying the message received by the receiving function in association with an icon that is associated with an account corresponding to a user that has transmitted the message; and a changing function of changing, when the message includes icon information to be displayed as a sender of the message, the icon corresponding to the account that has transmitted the message. The outputting function outputs, when the changing function changes the icon, display information for displaying the message received by the receiving function in association with the changed icon.

BRIEF DESCRIPTION OF THE DRAWINGS

The above and/or other aspects will be more apparent by describing certain example embodiments, with reference to the accompanying drawings, in which:

FIG. 3A is an example of a data format of a message, FIG. 3B is a conceptual diagram illustrating an example of a data configuration of icon data stored in the server, FIG. 8A is a diagram illustrating an example of a push notification screen, FIG. 8B is a diagram illustrating an example of a push notification screen in a state where an icon is switched, and FIG. 9 is a sequence diagram illustrating an example of a process of the communication system according to a second example embodiment.

DETAILED DESCRIPTION OF EMBODIMENTS

Figure 1:
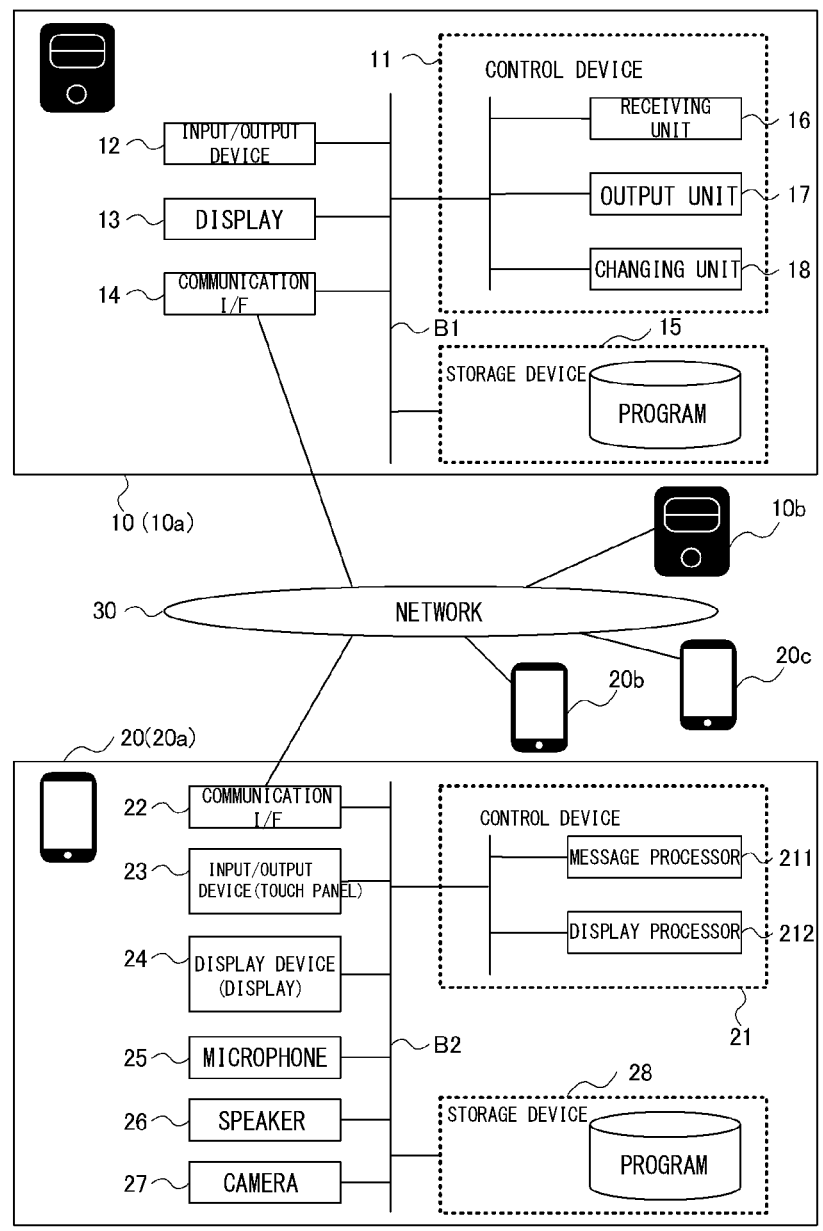
FIG. 1 is a diagram illustrating a configuration of a communication system according to one aspect of an embodiment.

It should be noted that the disclosure disclosed in the description should be performed in compliance with legal matters concerning communication confidentiality.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

<System Configuration>

FIG. 1 is a diagram illustrating a configuration of a communication system according to an example embodiment. As shown in FIG. 1, in the communication system, servers 10 and terminals 20 (terminals 20A, 20B, and 20C) are connected via a network 30. Each server 10 provides the terminals 20 owned by the users with a service for transmitting and receiving messages among the terminals 20 via the network 30. The number of terminals 20 connected to the network 30 is not limited.

The network 30 serves to connect one or more terminals 20 and one or more servers 10. That is, the network 30 refers to a communication network that provides a connection path so that data can be transmitted and received after each terminal 20 connects to the server 10.

For example, one or more portions of the network 30 may be a wired or wireless network. The network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a part of the Internet, a part of a public switched telephone network (PSTN), a mobile telephone network, integrated service digital networks (ISDNs), a wireless LAN, long term evolution (LTE), code division multiple access (CDMA), Bluetooth (registered trademark), satellite communication, or a combination of two or more of them, for example. However, in the present disclosure, the network 30 is not limited thereto. Also, network 30 may include one or more networks 30.

The terminal 20 (the terminal 20A, the terminal 20B, and the terminal 20C) may be any terminal as long as it is an information processing terminal capable of embodying the functions described in the embodiments. The terminal 20 is typically a smartphone, and also includes a mobile phone (e.g., a feature phone), a computer (e.g., a desktop, a laptop, and a tablet), a media computer platform (e.g., a cable set-top box, a satellite set-top box, and a digital video recorder), a handheld computing device (e.g., a personal digital assistant (PDA), and an email client), a wearable terminal (e.g., a glasses-type device, and a watch-type device), or other types of computers, or communication platforms. However, in the present disclosure, the terminal 20 is not limited thereto. The terminal 20 may be referred to as an information processing terminal.

The configurations of terminal 20A, terminal 20B, and terminal 20C may be substantially the same, and therefore the terminal 20 will be described as a representative in the following description. Further, the user information associated with the terminal 20X will be described as user information X and the user that operates the terminal 20X will be described as user X as needed. The user information is a part or all of information associated with an account in a social network service (SNS) represented by an instant messenger, and is directed to, for example, a user name or a user image. In addition, the user information may include information such as a user identifier, an age, a gender, and an address of a user, or a combination thereof. However, the information is not limited thereto.

The server 10 has a function of providing a predetermined service to the terminal 20. The server 10 may be any device as long as the information processing apparatus can embody the functions described in the embodiments. The server 10 is typically a server device, and includes a computer (e.g., a desktop, a laptop, and a tablet), a media computer platform (e.g., a cable set-top box, a satellite set-top box, and a digital video recorder), a handheld computer device (e.g., a PDA, and an email client), or other types of computers, or communication platforms. However, in the present disclosure, the server 10 is not limited thereto. Further, the server 10 may be referred to as an information processing apparatus.

<Hardware (HW) Configuration>

The hardware HW configuration of the devices included in the communication system will be described with reference to FIG. 1.

(1) HW Configuration of Terminal

The terminal 20 includes a control device 21 (e.g., a central processing unit (CPU), a processor), a storage device 28, a communication interface (I/F) 22, an input/output device 23, a display device 24, a microphone 25, a speaker 26, and a camera 27. The components of the HW of the terminal 20 are connected to each other via a bus B2, for example.

The communication I/F 22 transmits and receives various data via the network 30. The communication may be performed by wire or wirelessly, and any communication protocol may be used as long as mutual communication can be performed. The communication I/F 22 has a function of communicating with the server 10 via the network 30. The communication I/F 22 transmits various data to the server 10 according to instructions from the control device 21. The communication I/F 22 also receives various data from the server 10 and transfers the data to the control device 21.

The input/output device 23 includes a device for inputting various operations to the terminal 20 and a device for outputting a processing result processed by the terminal 20. In the input/output device 23, the input device and the output device may be integrated, or may be separated into the input device and the output device.

The input device is embodied by any one or a combination of all types of devices capable of receiving an input from a user and transmitting information on the input to the control device 21. The input device may include, for example, a touch panel that detects a contact by a pointing tool such as a user's finger or a stylus and the contact position, and may transmit the coordinates of the contact position to the control device 21. Alternatively, the input device may be embodied by an input device other than the touch panel. The input device includes, for example, hardware keys typified by a keyboard, a pointing device such as a mouse, a camera (operation input via a moving image), and a microphone (voice operation input). However, in the present disclosure, the input device is not limited thereto.

The output device is embodied by any one or a combination of all types of devices capable of outputting the processing result processed by the control device 21. The output device may be embodied as a touch panel, for example. Alternatively, the output device may be embodied by an output device other than the touch panel. The output device may include a speaker (audio output), a lens (for example, three dimensions (3D) output or a hologram output), and a printer, for example. However, in the present disclosure, the output device is not limited thereto.

The display device 24 is embodied by any one or a combination of all types of devices capable of displaying according to the display data written in the frame buffer. The display device 24 may be embodied as a monitor (for example, a liquid crystal display or an organic electroluminescence display (OELD)). The display device 24 may be a head mounted display (HMD). Further, the display device 24 may be embodied by a device capable of displaying an image and text information, for example, in the air (or in a vacuum) such as projection mapping, and a hologram. The display devices 24 may be capable of displaying display data in 3D. However, in the present disclosure, the display device 24 is not limited thereto.

When the input/output device 23 is a touch panel, the input/output device 23 and the display device 24 may be arranged to face each other with substantially the same size and shape.

The control device 21 has a physically structured circuit for executing a function embodied by a code or an instruction included in a program, and is embodied by, for example, a data processing apparatus built in hardware.

The control device 21 may include any one or any combination of a central processing unit (CPU), a microprocessor, a processor core, a multiprocessor, an application-specific integrated circuit (ASIC), and a field programmable gate array (FPGA). However, in the present disclosure, the control device 21 is not limited thereto.

The storage device 28 has a function of storing various programs and various data required for the operations of the terminal 20. The storage device 28 is embodied by various storage media such as a hard disk drive (HDD), a solid state drive (SSD), a flash memory, a random access memory (RAM), and a read only memory (ROM). However, in the present disclosure, the storage device 28 is not limited thereto.

The terminal 20 stores the program P in the storage device 28, and executes the program P so that the control device 21 executes a process as each of the units included in the control device 21. That is, the program P stored in the storage device 28 causes the terminal 20 to embody each of the functions executed by the control device 21.

The microphone 25 is used for inputting audio data. The speaker 26 is used for outputting audio data. The camera 27 is used for acquiring moving image data.

(2) Server HW Configuration

The server 10 includes a control device 11 (CPU), a storage device 15, a communication interface (I/F) 14, an input/output device 12, and a display 13. The components of the HW of the server 10 are connected to each other via a bus B, for example.

The control device 11 has a physically structured circuit for executing a function embodied by a code or an instruction included in a program, and is embodied by, for example, a data processing apparatus built in hardware.

The control device 11 may include any one or any combination of a central processing unit (CPU), a microprocessor, a processor core, a multiprocessor, an ASIC, or an FPGA. However, in the present disclosure, the control device 11 is not limited thereto.

The storage device 15 has a function of storing various programs and various data required for the operations of the server 10. The storage device 15 is embodied by various storage media such as an HDD, an SSD, and a flash memory. However, in the present disclosure, the storage device 15 is not limited thereto.

The communication I/F 14 transmits and receives various data via the network 30. The communication may be performed by wire or wirelessly, and any communication protocol may be used as long as mutual communication can be performed. The communication I/F 14 has a function of communicating with the terminal 20 via the network 30. The communication I/F 14 transmits various data to the terminal 20 according to an instruction from the control device 11. The communication I/F 14 also receives various data transmitted from the terminal 20 and transfers the data to the control device 11.

The input/output device 12 is embodied by a device for receiving inputs for various operations to the server 10. The input/output device 12 is embodied by any one or a combination of all types of devices capable of receiving an input from a user and transferring information on the input to the control device 11. The input/output device 12 may be embodied by a hardware key represented by a keyboard, for example, or a pointing device such as a mouse. The input/output device 12 may include a touch panel, a camera (operation input via a moving image), and a microphone (voice operation input), for example. However, in the present disclosure, the input/output device 12 is not limited thereto.

The display 13 may be embodied as a monitor (for example, a liquid crystal display or an organic electroluminescence display (OELD)). The display 13 may be a head-mounted display (HMD), for example. The display 13 may be capable of displaying display data in 3D. However, in the present disclosure, the display 13 is not limited thereto. The server 10 stores the program P in the storage device 15 and executes the program P so that the control device 11 executes a process as each of the units included in the control device 11. That is, the program P stored in the storage device 15 causes the server 10 to embody each of the functions executed by the control device 11.

In the embodiments of the present disclosure, a description will be given assuming that the CPU of the terminal 20 and/or the server 10 embodies the functions of the units by executing the program P.

The control device 21 of the terminal 20 and/or the control device 11 of the server 10 may embody the processes by not only the CPU but also a logic circuit (hardware) formed on an integrated circuit (e.g., an integrated circuit (IC) chip and a large scale integration (LSI)), or a dedicated circuit. Further, these circuits may be embodied as one or more integrated circuits, and the processes described in the embodiments may be embodied as one integrated circuit.

Further, the LSI may be referred to as a VLSI, a super LSI, and an ultra LSI, for example, depending on the degree of integration.

In addition, the programs P (software programs/computer programs) of the embodiments of the present disclosure may be provided in a state in which they are stored in a computer-readable storage medium. The storage medium is capable of storing the programs on a "temporary tangible medium."

The storage medium may include one or more semiconductor-based or other integrated circuits (ICs) where appropriate, such as, for example, a field programmable gate array (FPGA) or an application specific integrated circuit (ASIC), a hard disk drive (HDD), a hybrid hard drive (HHD), an optical disk, an optical disk drive (ODD), a magneto-optical disk, a magneto-optical drive, a floppy (registered trademark) diskette, floppy (registered trademark) disk drive (FDD), a magnetic tape, a solid-state drive (SSD), a RAM drive, a secure digital card or drive, any other suitable storage medium, or a suitable combination of two or more of them. The storage medium may be volatile, non-volatile, or a combination of volatile and non-volatile, where appropriate. The storage medium is not limited to these examples, and may be any device or medium as long as the program P can be stored.

For example, the server 10 and/or the terminal 20 can embody the functions of the plurality of functional units described in the embodiments by reading the program P stored in the storage medium and executing the read program P.

In addition, the program P according to the present disclosure may be provided to the server 10 and/or the terminal 20 via an optional transmission medium (such as a communication network and a broadcast wave) capable of transmitting the program. The server 10 and/or the terminal 20 embody the functions of the plurality of functional units described in the embodiments, for example, by executing the program P downloaded via the Internet.

In addition, the embodiments of the present disclosure may also be embodied in the form of a data signal embedded in a carrier wave in which the program P is embodied through electronic transmission. At least a part of the processing in the server 10 and/or the terminal 20 may be embodied by cloud computing configured by one or more computers. The server 10 may be configured to perform at least a part of the processing in the terminal 20. In this case, for example, the server 10 may be configured to perform at least a part of the processes of the functional units of the control device 21 of the terminal 20. The terminal 20 may be configured to perform at least a part of the processes in the server 10. In this case, for example, the terminal 20 may be configured to perform at least a part of the processes of the functional units of the control device 11 of the server 10. In the present disclosure, the configuration for performing a determination operation may be omitted, and in that case, a predetermined process may be performed if a condition for the determination is satisfied, or another predetermined process may be performed if the determination condition is not satisfied.

The program of the present disclosure may be implemented using, for example, a script language such as ActionScript and JavaScript (registered trademark), an object-oriented programming language such as Objective-C and Java (registered trademark), and a markup language such as HTML5. However, the present disclosure is not limited thereto.

First Embodiment

In the first embodiment, with one account, an icon indicating a user is changed to allow another user in the same chat room to recognize at a glance that the user has been switched. In addition, in the first embodiment, the user name may also be changed as well as the change of the icon.

In the first embodiment, the description will be given assuming that the change of the icon may occur according to a default setting and the change of the user name may occur according to an optional setting. Alternatively, the change of the user name may occur according to a default setting and the change of the icon may occur according to an optional setting. In another example, both the change of the icon and the change of the user name may occur according to a default setting.

Figure 2A:
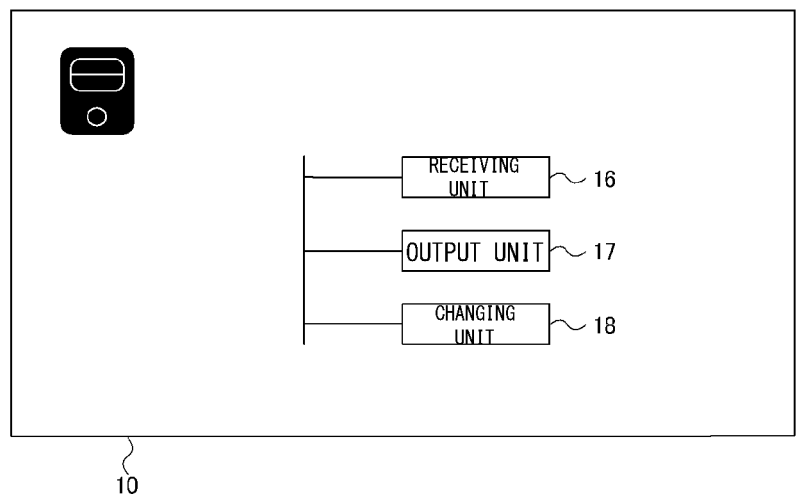
FIGS. 2A and 2B are diagrams each illustrating a configuration of a server according to an example embodiment.

As an example, as shown in FIG. 2A, the server (information processing apparatus) 10 includes a receiving unit (e.g., a receiver) 16, an output unit (e.g., an output interface) 17, and a changing unit 18.

The server 10 provides a chat room for exchanging messages between at least a first user corresponding to the first account and a second user corresponding to the second account.

The receiving unit 16 receives a message.

Further, the output unit 17 outputs display information for displaying the message received by the receiving unit 16 in association with the icon that is associated with the account corresponding to the user that has transmitted the message.

When the message includes icon information to be displayed as the sender of the message, the changing unit 18 changes and displays the icon corresponding to the account that has transmitted the message.

Here, when the changing unit 18 changes the icon, the output unit 17 outputs display information for displaying the message received by the receiving unit 16 in association with the changed icon.

Figure 2B:
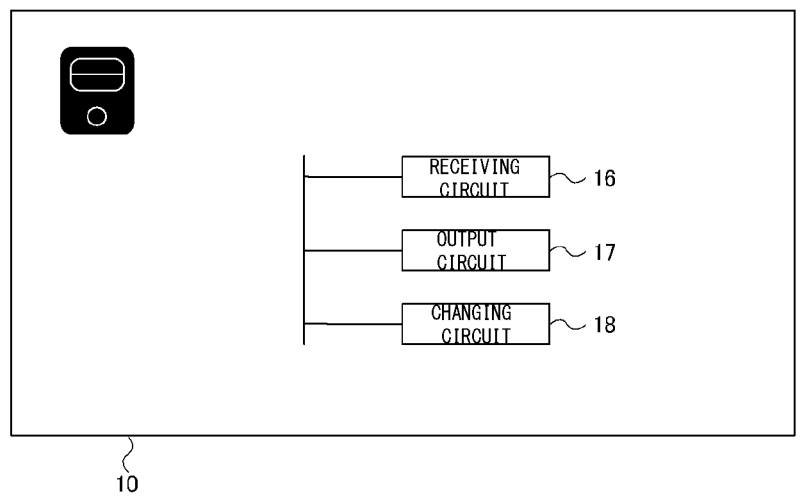

A communication system including such a server 10 will be described in detail below. The functional units shown in FIG. 2A may be configured as a circuit having equivalent functions as shown in FIG. 2B, in which one circuit embodies functions of a plurality of functional units.

The contents described in the first embodiment can be applied to any of the other embodiments. Further, functions normally included in various servers and terminals are also assumed to be included in the server 10 and the terminal 20, and descriptions thereof are omitted.

<Functional Configuration>

(1) Functional Configuration of Terminal

As shown in FIG. 1, the terminal 20 includes a message processor 211 and a display processor 212 as functions embodied by the control device 21. Although FIG. 1 illustrates two separate processors 211 and 212, the operations of the message processor 211 and the display processor 212 may be performed by a single processor, or more than two processors.

The message processor 211 has a function of transmitting and receiving a message in a chat room and displaying the transmitted and received message on its own terminal, for example. On a display screen, a received message is displayed on the left and a transmitted message is displayed on the right with respect to a time axis from top to bottom. In the case where a message is received when the chat room is not displayed on the display device 24, the message processor 211 generates an image for push notification of the message, and displays the image on, for example, a standby screen. At this time, the message processor 211 may allow the push notification to include the user name and/or user icon of the user corresponding to the message. Further, the message processor 211 generates a message in the data format shown in FIG. 3A in response to input of information for changing the user icon and/or the user name of the user and the contents of the message, and allows the message to be transmitted through the communication I/F 22 to the server 10.

The display processor 212 displays the display data generated by the message processor 211 via the display device 24. The display processor 212 has a function of converting the display data into pixel information and writing the pixel information into a frame buffer of the display device 24.

(2) Functional Configuration of Server

As shown in FIG. 1, the server 10 includes a receiving unit 16, an output unit 17, and a changing unit 18 as functions embodied by the control device 11.

The receiving unit 16 receives a message for the chat room. When the received message corresponds to a message to be written in the chat room, the receiving unit 16 transmits the received message to the output unit 17. If the received message includes information on the change of the user, the receiving unit 16 also transmits the received message to the changing unit 18.

Here, an example of a data format of a message received by the receiving unit 16 will be described with reference to FIG. 3A. The example of the data format of the message also serves as the format of the message created by the transmission side. As shown in FIG. 3A, the message 310 includes a destination user ID field 311, a message type field 312, a message contents field 313, an icon information field 314, and a user name information field 315.

The destination user ID field 311 may include information indicating the user as the destination of the message. The destination user ID field 311 may include information for specifying the chat room (e.g., a unique number or code assigned to the chat room in which the user participates). The message type field 312 may include information indicating the type of information of the push message, and indicates a type such as text data or image data.

The message contents field 313 may include information indicating the contents of the body of the message displayed in the chat room or the push message, for example, which may be text or an image.

The icon information field 314 may include information for specifying an icon to be displayed when the icon corresponding to the account is changed in the chat room, to show the user who sent the message to another user. The icon may include text (e.g., a user name) and/or an image (e.g., a profile image) as set by the account user, a conversation partner of the account user, or default. The icon information field 314 may include identification information capable of specifying the icon, information specifying a storage location where an icon image is stored on a network, or the icon image itself. The icon information field 314 may include information on the change of the user described above depending on the presence/absence of the icon information in the icon information field 314. When the icon information is included in the icon information field 314 of the message, the user corresponding to the account is changed. In the present embodiment, the icon information 314 is defined to be directed to information indicating the location of the icon.

The user name information field 315 may include text data indicating the changed user name when the icon corresponding to the account in the chat room and the user name are changed. When the user name information 315 is included in the message, the message indicated by the message contents field 313 included in the message is sent with the user name indicated by the user name information field 315.

As described above, the icon information field 314 and the user name information field 315 each are newly provided as one of the fields that define the message to be transmitted and received, allowing the user icon and the user name as the sender of the message in the chat room to be easily changed. Further, an application programing interface (API) for changing the icons need not be provided separately, achieving an advantage of reducing a delay and an error in comparison to a case where a message and a request for changing the icon are separately transmitted from the terminal to the server. The advantage above avoids a transmission of the message without changing the icon and/or the user name of the message. The advantage above also reduces the communication amount in comparison to a case where a message and a request for changing the icon are separately transmitted from the terminal to the server.

In the example of the data format of the message to be transmitted and received shown in FIG. 3A, when the user is not changed, the icon information field 314 and the user name information field 315 may be left blank. In another example, the icon information field 314 and the user name information field 315 may contain a value (e.g., value "1") or a code that indicates that the user has not been changed.

The output unit 17 outputs display information for displaying the message received by the receiving unit 16 in association with the icon that is associated with the account corresponding to the user that has transmitted the message. Here, the display information is directed to display information indicating a chat room. In particular, when the changing unit 18 has temporarily changed the icon of the user corresponding to the received message, the output unit 17 generates the display information of the chat room in which the changed icon is associated with the message. Here, the operation of generating the display information of the chat room may include the operation of displaying the received message and the icon in association with each other in the chat room. When the user name is changed, the operation of generating the display information of the chat room may include the operation of displaying the changed user name together with the message in the chat room. That is, when the display information of the chat room is generated, information is generated to be displayed in the chat room displayed in each terminal 20. The display information of the chat room generated by the output unit 17 is transmitted through the communication I/F 14 to the terminal 20 corresponding to the chat room.

When receiving a message including the information on the change of the user from the receiving unit 16, the changing unit 18 changes the user corresponding to the account indicated by the message to another user. According to the example of the data format of the message described above, when the message includes the icon information field 314, the changing unit 18 changes the icon of the corresponding message to the icon indicated by the icon information field 314, and changes the user that has sent the message to the user indicated by the contents of the user name information field 315. The message include the icon information field 314 and the user name information field 315 as described above, allowing the icon and/or the user name as the sender of the message in the chat room to be easily changed. As another example, in a case where a plurality of users are associated with one account of at least two accounts participating in the chat room, when a request for switching one of the plurality of users is received, a user other than the one of the plurality of users may be changed as a user that can use the one account. However, the example is not limited to this. More specifically, in a case where a plurality of users John, Mark, and Jenny can use an account A, when a request for switching the user is received in a state where John can use the account A, the user is switched to Mark or Jenny as a user that can use the account A. In the example of the data format above, the icon information field 314 may specify any one of a plurality of users corresponding to the account. When a plurality of users is associated with one account, a user that can normally use the one account may be set, and the change of the user by the changing unit 18 may be temporary. Accordingly, when the temporarily changed user has finished using the one account, the changing unit 18 may delete the change setting to return the usage right to the user that can normally use the one account.

The storage device 15 of the server 10 stores information on icons corresponding to the users as shown in FIG. 3B to embody the change of the icon. FIG. 3B is a conceptual data diagram illustrating an example of the icon information 300. As shown in FIG. 3B, the icon information 300 corresponds to information in which an icon ID 301, a user name 302, and a user icon 303 are associated with each other.

The icon information 301 corresponds to identification information capable of uniquely specifying an icon on the communication system, and also information to be compared with the icon information included in the icon information field 314 of the message. If the icon information 300 includes the icon ID 301 that corresponds to the icon information included in the icon information field 314, the corresponding user icon 303 is used as the icon as the sender of the message.

The user name 302 corresponds to information indicating the name of the user in the chat room, in which each name is associated with a corresponding piece of the icon ID 301. The user name 302 is optional.

The icon 303 corresponds to image information indicating the user's own icon used by the user in the chat room, in which each icon is associated with a corresponding piece of the icon ID 301. The user icon 303 can be set by the user in his or her own profile settings.

The presence of the icon information 300 allows the control device 11 to display, even when the icon is changed, the message of the user participating in the chat room in association with the changed icon.

The storage device 15 stores an account and a user ID in association with each other, and also stores information indicating to which chat room the account corresponds. At this time, a plurality of user IDs may be stored in association with one account. However, the user that can use the one account at a time is only the user corresponding to one user ID of the plurality of associated user IDs.

Although the details are omitted here, the control device 11 is responsible for the entire process of exchanging the messages in the chat room, and has a function of updating the information to be displayed in the corresponding chat room each time when a message is received from the user, and notifying the other users participating in the chat room of the message.

(3) Exchange in Communication System

Figure 4:
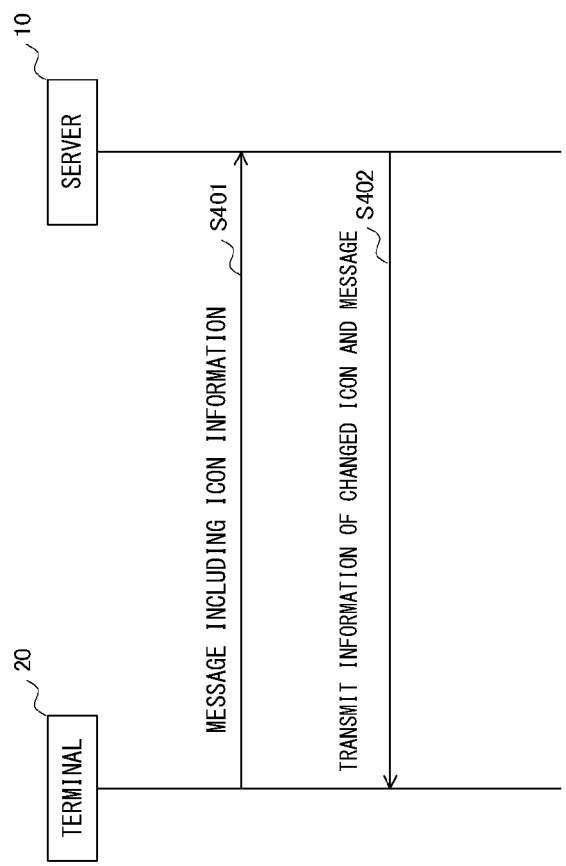
FIG. 4 is a sequence diagram illustrating an example of a process of the communication system according to a first example embodiment.

FIG. 4 is a sequence diagram illustrating exchange in the communication system. The sequence diagram shown in FIG. 4 illustrates an exchange when a user issues a request for switching a user.

The terminal 20 transmits a message including the icon information to the server 10 in response to the input from the user (step S401).

The server 10 that has received the message changes the icon. Here, the change of the icon refers to a fact that the icon indicated as the sender associated with one account is temporarily changed to the other icon specified in the message. The server 10 then transmits the display information in which the changed user icon and the message are associated with each other to the terminal 20, i.e., transmits information of the changed icon and the message as information to be newly displayed in the chat room displayed on the terminal 20 (step S402). This displays the changed icon and the message in association with each other in the chat room of the terminal 20.

In example embodiments of the present disclosure, operations S401 and S402 may occur without indicating or displaying that an existing conversation partner has left the chat room.

(4) Operations of Server 10

Figure 5:
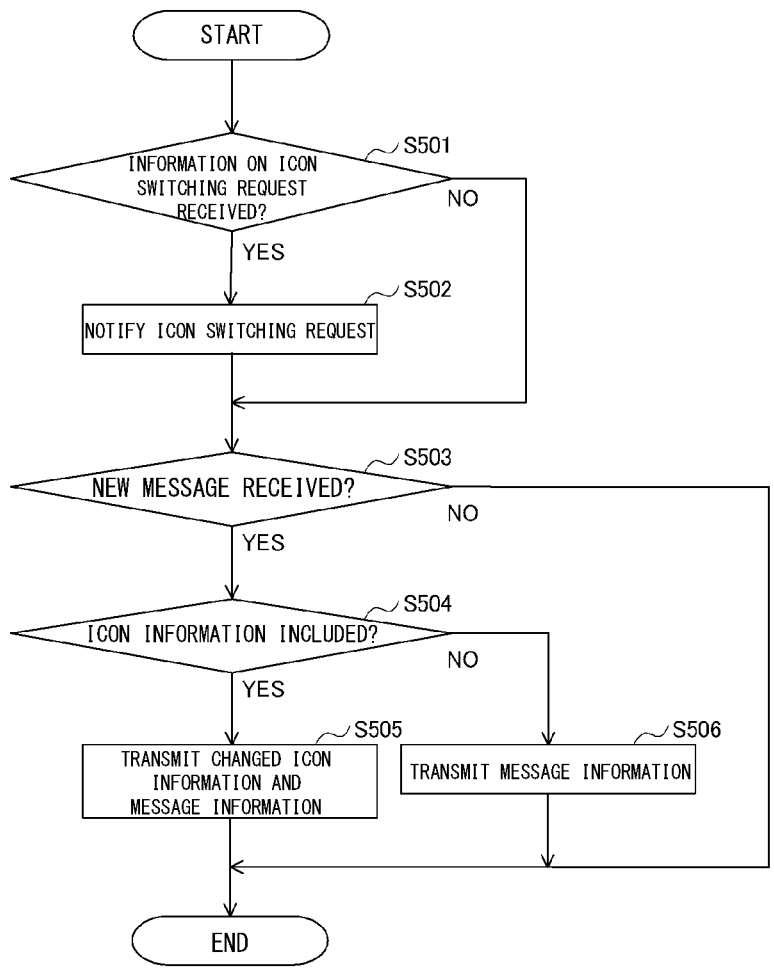
FIG. 5 is a flowchart illustrating an example of a process of the server related to a switching of a user according to the first example embodiment.

FIG. 5 is a flowchart illustrating operations of the server 10 when the server 10 receives information on a request for switching the user.

As shown in FIG. 5, the receiving unit 16 of the control device 11 determines whether a message including information on a request for switching the icon is received through the communication I/F 14 (step S501). The request for switching the icon here refers to a request for, in the case where the server 10 is responding in a chat room using a bot user, switching the bot user to an operator, or vice versa.

If a message including the information on the request for switching the icon is received (YES in step S501), the receiving unit 16 outputs the message to the display 13, and the operator is notified of the request for switching the user (switching the icon) (step S502). In this case, as an example, the changing unit 18 may change the user that uses the account from the bot to the operator or from the operator to the bot. If a message that does not include the information on the request for switching the user is received (NO in step S501), the process proceeds to step S503.

In step S503, the receiving unit 16 of the server 10 determines whether a new message is received (step S503). Here, the receiving unit 16 receives a message from the terminal 20 received through the communication I/F 14, a message by the control device 11 as a bot user in the chat room, or a message input by the operator.

The receiving unit 16 determines whether the received message includes the icon information field 314 and/or determines whether the icon information field 314 indicates that the icon information has been changed (step S504). If the received message includes the icon information field 314 and/or the icon information field 314 indicates that the icon information has been changed (YES in step S504), the changing unit 18 changes the icon of the user corresponding to the account to information included in the icon information field 314. The output unit 17 transmits information including the contents of the received message and the image of the icon specified in the icon information field 314 to the terminal 20 corresponding to the chat room. That is, the output unit 17 associates the received message with the changed icon to update the information to be displayed in the chat room, and transmits the information displayed in the chat room through the communication I/F 14 to the terminals 20 of the users included in the chat room (step S505), and the process is completed.

When the received message does not include the icon information field 314 and/or when the icon information field 314 does not include the icon information (NO in step S504), the output unit 17 transmits the information to be displayed in the chat room through the communication interface I/F to the terminals 20 of the users included in the chat room (step S506), and the process is completed. That is, the output unit 17 transmits information including the contents of the received message and having the icon information 314 field blank to the terminals 20 corresponding to the chat room (step S506), and the process is completed.

By performing the processes shown in FIG. 5, even when a user is switched, the server 10 can provide an instant messaging service allowing the other users participating in the chat room to check that the user is switched at a glance. Especially, in a service having a switch between the bot user that automatically responds and the operator, the switch between the bot user that automatically responds and the operator can be clarified, providing a highly convenient instant messaging service for the user.

(5) Operations of Terminal 20

Figure 6:
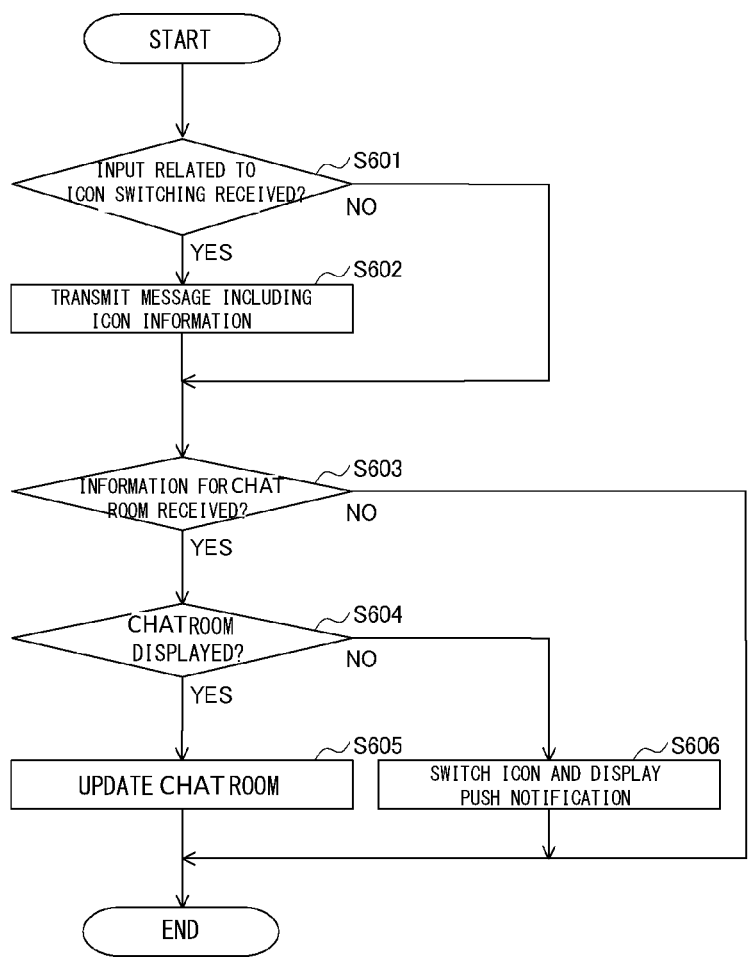
FIG. 6 is a flowchart illustrating an example of a process of a terminal related to the switching of the user according to the first example embodiment.

FIG. 6 is a flowchart illustrating processing related to the instant messaging service in the terminal 20.

As shown in FIG. 6, first, the input/output device 23 of the terminal 20 determines whether an input related to the switching of the icon is received (step S601). The switching of the icon here refers to a temporary change of the icon in an account that can be used by the user him/herself, and also an input of icon information indicating the icon of the user that sends a message. The input/output device 23 transmits a received request for switching the icon to the control device 21.

In the case where the input related to the switching of the icon is received (YES in step S601), when the input related to the switching of the icon and the input of the message are received, the control device 21 transmits the message including the icon information through the communication I/F 22 to the server 10 (step S602). The message may include information indicating the chat room in which the user participates, in the destination user ID field 311, and the icon information of the user that participates in the chat room, in the icon information field 314, and may further include the changed user name information in the user name information field 315.

If the input related to the switching of the icon is not received (NO in step S601), the communication I/F 22 determines whether the information of the chat room is received from the server 10 (step S603). If new information (message) to be displayed in the chat room is received from the server 10 (YES in step S603), the communication I/F 22 transmits the information to the control device 21 and if the new information is not received (NO in step S603), the process is completed.

When the new information (message) to be displayed in the chat room is received, the message processor 211 of the control device 21 determines whether the chat room is displayed (step S604). If the chat room is displayed (step S604: YES), the message processor 211 updates the display contents of the chat room. At this time, if a message including the switching of the icon by the user is displayed, the message processor 211 displays the chat room in which the icon of the user from that point in time becomes a changed icon in association with the message on the display device 24. When the message processor 211 receives new information to be displayed for the chat room and the chat room is not displayed (NO in step S604), the message processor 211 issues a push notification in which the message received as the information for the chat room, the icon of the corresponding user (the changed icon), and the corresponding user name are associated with one another (step S606), and the process is completed. At this time, if the message in which the icon is changed is registered in the chat room, a push notification of the message corresponding to the changed icon is issued. The processing shown in FIG. 6 is regularly and repeatedly performed in the terminal 20.

The above processing allows the terminal 20 to issue a request for switching the user, and the server 10 to switch the user in response to the request for switching the user, and display the state of the chat room in which the icon is changed. The switching of the icon of the user allows a plurality of users that can use one account to check the switching at a glance.

(6) Example of Display Screen

Figure 7A:
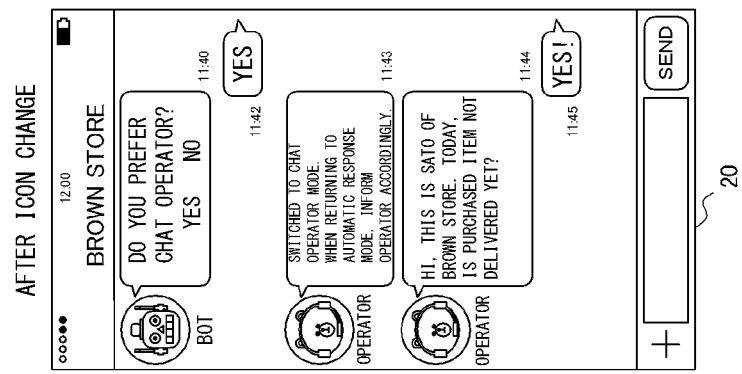
FIG. 7A is a diagram illustrating an example of a chat room screen.

Hereinafter, the switching of the icon will be described using a specific example. FIG. 7A is a screen diagram illustrating an example of exchange of messages in the chat room as an example. The screen diagram corresponds to a screen diagram displayed on the display device 24 of the terminal 20.

FIG. 7A illustrates a state in which a bot that automatically responds and a user exchange messages in the chat room. As shown in FIG. 7A, the messages of the conversation partner are displayed on the left side of the screen, and the messages of the user are displayed on the right side. Further, the messages of the conversation partner display the user icon and the user name of the conversation partner in association with each other to facilitate identification of the user as the conversation partner.

Figure 7B:
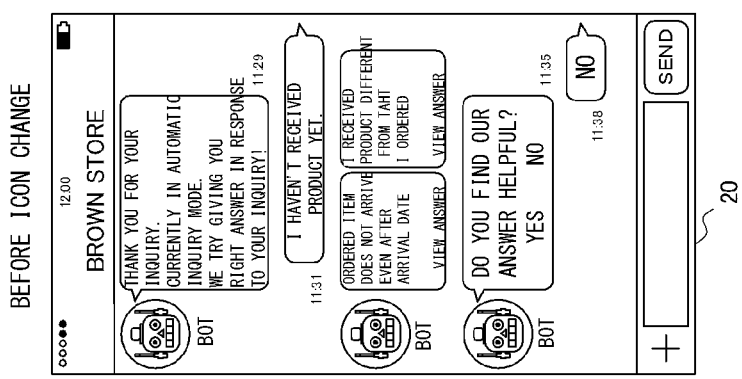
FIG. 7B is a diagram illustrating an example of a chat room screen in a state where an icon is switched.

As shown in the example of FIG. 7A, when messages are exchanged by an automatic response, an answer as intended by the user may fail to be obtained. Accordingly, it is assumed that the user has made an input to the terminal 20 to request the switch of the users. For example, it is assumed that "YES" shown in the message of the bot in FIG. 7B is touched. A message including a request for switching the user is then transmitted from the terminal 20 to the server 10.

In response to the request for switching the user, the server 10 then changes the user of the account corresponding to the user "bot" to, for example, an operator as a person that provides an actual service. Here, the change to the operator refers to a fact that the responding subject changes from the "bot" to the "(human) operator," and also refers to a fact that the automatic response is terminated. At this time, the operator transmits a message including the icon information field 314 and the user name information field 315, which respectively store the icon information and the user name information of the operator, from the terminal operated by himself/herself to the server 10.

Accordingly, the terminal 20 receives the message including the icon information 314 and the user name information 315 as new information to be displayed for the chat room, and as shown in FIG. 7B, after the user is changed (after the icon is changed), the message and the user name are displayed in association with the changed user icon.

Therefore, when a user is switched to another user for one account (for example, when the bot user is switched to the operator as shown in FIG. 7B), the counterpart user that participates in the chat room is allowed to clearly recognize that the user is switched from a fact that the icon is switched. In example embodiments, the previous chatroom participant (e.g., "bot") and the new chatroom participant (e.g., "(human) operator") may be associated with the same group account (e.g., a company customer service account). When the previous chatroom participant is switched to the new chatroom participant, the chartroom may omit displaying an indication that the previous chatroom participant has left the chatroom so that the conversation counterpart of the previous and new chatroom participants may feel that he/she is continuously receiving the customer support service from the same company or group.

In addition, since the correspondence between the message and the icon in the chat room is stored in the server 10 as information in which the icon is associated with each message, the message associated with the icon changed by the changing unit 18 can be visually recognized in a state where the message is associated with the changed icon at any time when the chat room is checked. That is, even if the messaging application provided by the instant messaging service is terminated once and then the messaging application is run again to check the chat room, the chat room in which the user icon is switched as shown in FIG. 7B can be checked.

Further, the user icon can be changed without changing the icon image set as the profile of the user corresponding to the account. Conventionally, a user that sets an icon image for an account can change the icon of the user displayed in a chat room, for example, by changing his or her own profile image. The communication system according to the present embodiment omits the process for switching the icon.

FIGS. 8A and 8B each illustrate an example of a display of a push notification when the terminal 20 receives a message in a state where the chat room is not displayed. FIG. 8A illustrates an example of a display before the icon is changed, and FIG. 8B illustrates an example of a display after the icon is changed.

FIG. 8A illustrates, in a case where the server 10 receives the message at 11:40 in FIG. 7B and transmits the message to the terminal 20 before the user is switched, an example of a push notification when a chat room is not displayed by the user on the terminal 20. As shown in FIG. 8A, the push notification notifies the user of a new message, and may also notify the user of the contents of the message, and the user icon and the user name of the user that has transmitted the message.

In contrast, FIG. 8B illustrates, in a case where the server 10 receives the message at 11:43 in FIG. 7B and transmits the message to the terminal 20 after the user is switched, an example of a push notification when a chat room is not displayed by the user on the terminal 20. As shown in FIG. 8B, even in the push notification, when the user is changed, the push notification is issued with the changed user name and user icon.

Although FIGS. 8A and 8B each illustrate an example of the push notification on the lock screen, the change of the user name and the user icon is not limited to the push notification on the lock screen.

As described above, the fact that the user is changed (the icon is changed) is reflected even on the push notification such that the user icon and the user name are changed.

Second Embodiment

The second embodiment is directed to an embodiment in which a server storing the icons is provided separately. The first embodiment illustrates that the server 10 is configured to store the icons and transmits the message input by the operator or the message automatically generated by the control device 11. In contrast, the second embodiment illustrates an example in which the server 10 acquires the icons from another icon server 900.

In the second embodiment, the description will be given assuming that the change of the icon is a necessary condition and the change of the user name is additional. Alternatively, the change of the user name may be a necessary condition and the change of the icon may be additional. Also, the change of the icon and the change of the user name may be a necessary condition.

In a manner different from that of the first embodiment, when the server 10 according to the second embodiment receives a message including the icon information 314, the communication I/F 14 transfers the icon information 314 to the icon server 900. When the communication I/F 14 of the server 10 receives the information of the icon from the icon server 900, the communication I/F 14 transmits the information to the control device 11, and the control device 11 associates the received icon with the contents of the message transmitted from the terminal 20 and updates the information to be displayed in the chat room.

Regarding the icon server 900, it has substantially the same configuration as that of the server 10 in both the hardware configuration and the functional configuration. However, the icon server 900 does not need to have a function of updating the information in the chat room. The icon server 900 receives the icon information 314, specifies the corresponding icon ID 301, and returns the associated icon 303 to the server 10.

FIG. 9 is a sequence diagram illustrating exchanges in the communication system when the icon server 900 is provided. As shown in FIG. 9, the terminal 20 transmits a message including the icon information 314 to the server 10 in response to the input from the user (step S401).

The server 10 that has received the message including the icon information 314 transfers the icon information 314 to the icon server 900 (step S901).

The icon server 900 that has received the icon information 314 specifies the corresponding icon ID 301. The icon 303 associated with the specified icon ID 301 is acquired and transmitted to the server 10 (step S902).

The server 10 that has received the icon updates the information to be displayed in the chat room in which the received user participates using the user icon received in the process in step S902 and the contents of the message received in step S401. The server 10 then transmits the information of the updated chat room including the new message with the changed icon to the terminal 20 (step S402).

Here, although an example in which the icon server 900 functions as a data server that only serves to transmit the icons is illustrated, the icon server 900 may serve as a bot user.

The communication system may be configured to include the two servers, i.e., the server 10 and the icon server 900 as described above. This configuration allows the icon server 900 to substitutes for the function of the server 10 in the first embodiment, reducing the processing load on the server 10. Further, an API for changing the icons need not be provided separately, achieving an advantage of limiting occurring of a delay and an error in comparison to a case where a message and a request for changing the icon are separately transmitted from the terminal to the server. The advantage above avoids a transmission of the message without changing the icon and/or the user name of the message. The advantage above also reduces the communication amount in comparison to a case where a message and a request for changing the icon are separately transmitted from the terminal to the server.

Modification 1

In the embodiments above, examples are given where a trigger in which the user that participates in the chat room inputs a request for switching the counterpart user to another (for example, switching the bot user to the operator) triggers switching between the bot user and the operator. The present disclosure is not limited to this.

The switching of the user may be performed by the operator of the server 10. Alternatively, the switching of the user may be automatically performed by the control device 11 of the server 10 in response to a trigger in which the control device 11 analyzes the message in the chat room and a predetermined keyword is included in the message.

As an example, when a chat room provides a service in which a character in a certain work makes a response, the input of the message related to a certain character by the user may be configured to trigger the switching the counterpart to the certain character. However, the present disclosure is not limited to this. In addition, the control device 11 of the server 10 alternately generates messages of a plurality of characters included in the certain work to show as if the characters are talking with each other to the user. At this time, in each message transmitted from the terminal that serves as the bot user to the server 10, information showing an image indicating the corresponding character is used for the icon information 314, and information showing the name of each character is used for the user name that is contained in the user name information field 315. The server 10 embodies the switching of the user icon and the user name in the chat room only by including information on the icon and information on the nickname (user name) in the message to be transmitted and received.

Modification 2

In the embodiments above, examples of a one-to-one talk are illustrated. However, in the group talk in which a plurality of users participates, the user may be switched among a plurality of users corresponding to one account in the same manner. In addition, at this time, in the chat room, information indicating the account may be displayed as well to allow the plurality of users to recognize that the user has been switched in the one account.

OTHERS

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A server configured to transmit a message from a first account registered with a social network service to a second account registered with the social network service, the second account being different from the first account, the server comprising:
   a communication interface;
   a memory configured to store computer-readable instructions; and
   one or more processors configured to execute the instructions to:
   control the communication interface to transmit a first message from the first account to the second account, so that the first message and a first image set by the first account are displayed in a terminal of a user of the second account, the first image being associated with the first account,
   control the communication interface to receive, from the second account, first information related to a user of the first account,
   control the communication interface to transmit second information related to a second image based on the first information, the second image being set by the first account and different from the first image, the second image being associated with the first account; and
   control the communication interface to transmit a second message from the first account to the second account, so that the second message and the second image based on the second information are displayed in the terminal of the user of the second account,
   wherein, when the first account is associated with a bot, the first information comprises information related to a change of a chat participant associated with the first account from the bot to the user of the first account associated with the first information, the user of the first account being different from the bot.

2. The server according to claim 1,
wherein the first information is a third message that is input into the second account.

3. The server according to claim 2,
wherein the third message comprises information of a name of the user that is associated with the first account.

4. The server according to claim 2,
wherein the first information comprises a keyword that is set for the first account.

5. The server according to claim 2,
wherein the first information comprises information regarding a change of the user of the first account.

6. The server according to claim 5,
wherein the first information comprises an answer to a question transmitted from the first account.

7. The server according to claim 1,
wherein the first image is associated with the bot, and
the second image is associated with the user of the first account.

8. The server according to claim 1,
wherein the first message is generated and transmitted by the server, when the first account is associated with the bot, a sender of the first message being the bot of the first account.

9. The server according to claim 2,
wherein the second message is a message that is transmitted by a terminal of an operator.

10. The server according to claim 1,
wherein the first image is associated with the first account by the terminal, and
the second image is associated with the first account by the terminal.

11. The server according to claim 1,
wherein the first message and the first image are displayed in a talk room comprising the first account and the second account, the talk room being displayed in a terminal of the user of the first account, and
the second message and the second image are displayed in the talk room displayed in the terminal of the user of the first account.

12. The server according to claim 6,
wherein the first information is displayed in a talk room.

13. The server according to claim 1,
wherein the server is a first server, and
the second image is stored in a second server that is different from the first server.

14. The server according to claim 1, wherein the second information specifies a storage location where the second image is stored.

15. A non-transitory computer-readable storage medium storing instructions that are executable by a processor of a server to:
transmit a first message from a first account registered with a social network service to a second account registered with the social network service, the second account being different from the first account, so that the first message and a first image set by the first account are displayed in a terminal of a user of the second account, the first image being associated with the first account;
receive, from the second account, first information related to a user of the first account;
transmit second information related to a second image based on the first information, the second image being set by the first account and different from the first image, the second image being associated with the second account; and
transmit a second message from the first account to the second account, so that the second message and the second image based on the second information are displayed in the terminal of the user of the second account,
wherein, when the first account is associated with a bot, the first information comprises information related to a change of a chat participant associated with the first account from the bot to the user of the first account associated with the first information, the user of the first account being different from the bot.

16. An information processing method of a server including a processor and a memory, the information processing method comprising:
transmitting a first message from a first account registered with a social network service to a second account registered with the social network service, the second account being different from the first account, so that the first message and a first image set by the first account are displayed in a terminal of a user of the second account, the first image being associated with the first account;
receiving, from the second account, first information related to a user of the first account;
transmitting second information related to a second image based on the first information, the second image being set by the first account and different from the first image, the second image being associated with the first account; and
transmitting a second message from the first account to the second account, so that the second message and the second image based on the second information are displayed in the terminal of the user of the second account,
wherein, when the first account is associated with a bot, the first information comprises information related to a change of a chat participant associated with the first account from the bot to the user of the first account associated with the first information, the user of the first account being different from the bot.

17. The server according to claim 1, wherein the social network service includes an instant messenger.

18. The server according to claim 1, wherein the one or more processors configured to further execute the instructions to control to set a profile image based on an instruction of the first account, and wherein the second image is displayed in the terminal of the user of the second account without changing the profile image by the first account.

* * * * *